2 Sheets—Sheet 1.
W. L. HUSSEY.
Road-Engine.
No. 207,524. Patented Aug. 27, 1878.
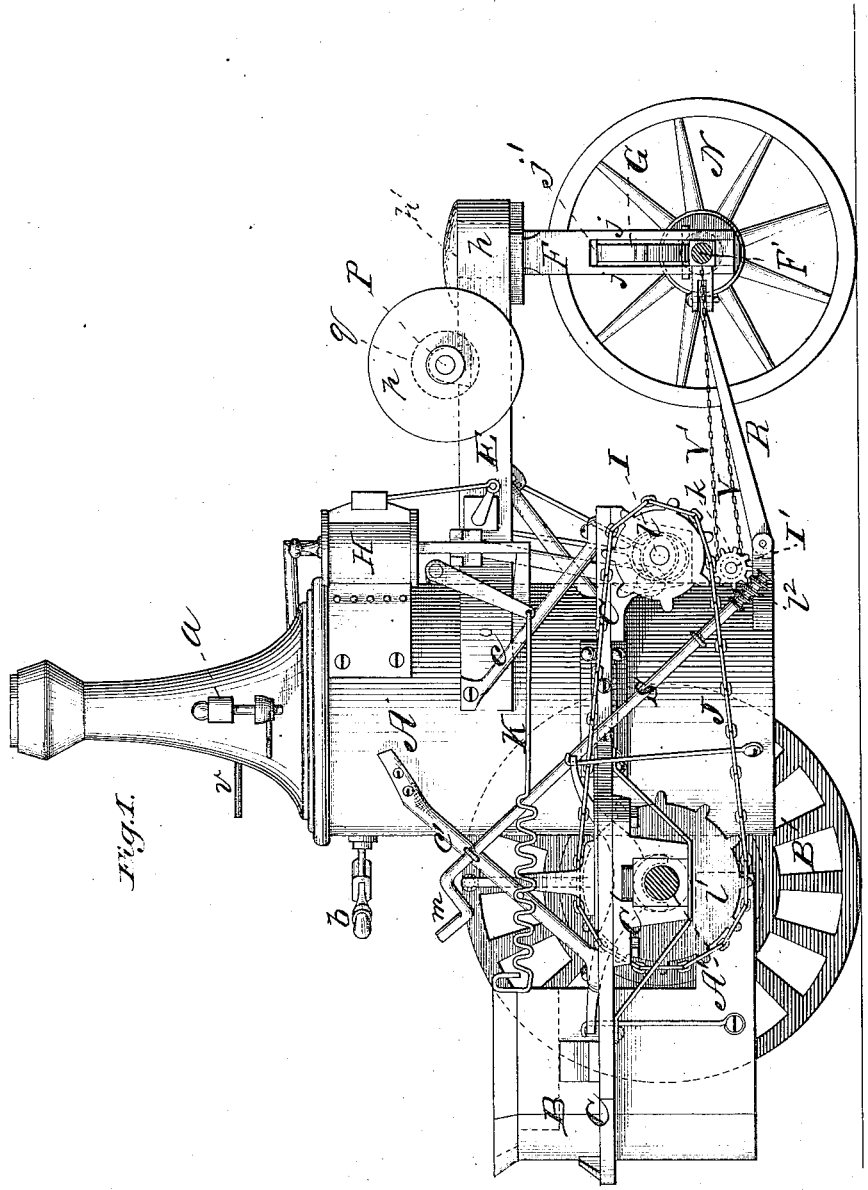
WITNESSES
INVENTOR
W. L. Hussey,
by E. W. Anderson,
ATTORNEY

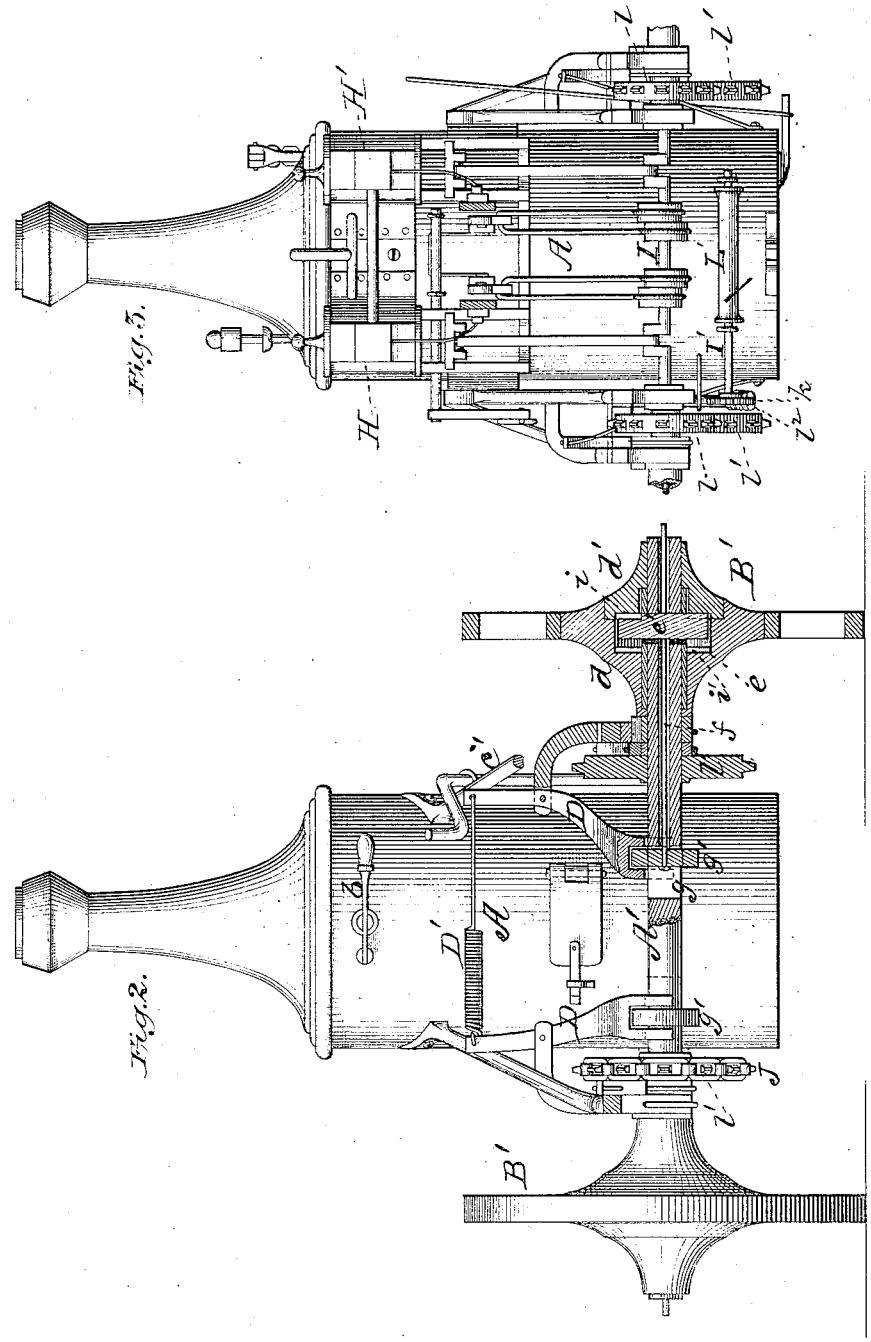
W. L. HUSSEY.
Road-Engine.
No. 207,524.  Patented Aug. 27, 1878.
WITNESSES
INVENTOR
W. L. Hussey,
by E. W. Anderson
ATTORNEY

UNITED STATES PATENT OFFICE.

WILLIAM L. HUSSEY, OF NEW VIENNA, OHIO.

IMPROVEMENT IN ROAD-ENGINES.

Specification forming part of Letters Patent No. 207,524, dated August 27, 1878; application filed July 20, 1878.

*To all whom it may concern:*

Be it known that I, W. L. HUSSEY, of New Vienna, in the county of Clinton and State of Ohio, have invented a new and valuable Improvement in Farm and Road Engines; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a longitudinal vertical section of my improved road-engine. Fig. 2 is a cross-section of the same, and Fig. 3 is a view of the boiler and engine detached.

This invention has relation to improvements in traction-engines for agricultural and other purposes; and the nature of the invention consists in the combination, with a boiler and engine, its rear supporting-frame, and its rear axle, having sprocket-wheels thereon, of a shaft actuated by said engine, and having sprocket-wheels in corresponding positions with those of the axle, and endless chains passing around said wheels.

It also consists in a certain novel construction of the engine-frame and reach connecting the same with the fore axle, whereby space is economized and great strength is secured.

It also consists in a clutch of novel construction, arranged in the hub of the driving-wheels and actuated by rods in the axle, as will be hereinafter more fully set forth.

In the accompanying drawings, the letter A designates an upright tubular boiler, having the usual steam-whistle $a$, throttle-valve lever $b$, and safety-valve $v$ upon its front and sides, within convenient reach of the driver standing in a cab, B. This cab is provided with receptacles for fuel and water, and is secured to a strong frame, C, rigidly bolted to the lower portion of the boiler, and prevented from sagging by means of the braces $c$ $c'$, respectively connecting the front and rear portions of said frame to the boiler. C' represent pedestals depending from said frame in rear of the boiler, and provided with axle-boxes not differing essentially from those commonly used on railroad-cars, in which the rear or driving axle of the mechanism has its bearings. This axle (designated by the letter A') is hollow at its ends, but solid at its central portion, and carries at each end a driving-wheel, B'. The wheels B' are made in two sections as to their hubs, the section $d$ supporting the spokes and tire, and the section $d'$ being passed over the axle and secured to section $d$ in any suitable manner. These sections form with each other a recess, $e$, the parallel vertical walls of which are ratcheted, as shown at $i$ and $i'$, and in this recess is a pawl-key, $e'$, extending through the axle and secured to the outer extremity of a metallic rod, $f$, in the bore of the axle aforesaid. The inner end of this rod is secured to a cross-head working in a slot, $g$, of said axle, and rigidly secured to a ring, $g'$, embracing the same. Rod $f$ is consequently movable endwise, and the key-pawl may be engaged either with the ratchet $i$ or the ratchet $i'$, at pleasure, or disengaged from both, thus allowing the wheels to turn or act independently of each other in turning or running in a curve, or allowing the movement of the engine to be in a forward or backward direction. The rods $f$ are operated independently by means of the levers D, whose forked ends straddle the axle and engage the rings $g'$, and which have their fulcrums upon the frame and their power ends connected by a spring, D'.

E represents a strong metallic reach, bolted securely to the front of the boiler A, extending out horizontally therefrom, and connecting the boiler with the front axle. This reach has at its free end a bracing, $h$, in which is journaled a cylindrical spindle, $h'$, upon the upper end of an angular support, F, the legs $j$ of which straddle and reach below the axle F', and inclose between them a strong elliptic spring, G, the ends of which project beyond said support between the legs $j$. This spring is rigidly secured to the axle F' and to a concave bearing, $j'$, at the upper end of the support, and yields regularly, thus preserving the mechanism from sudden jars. Upon the front of the boiler are the steam-cylinders H H', that, through the usual mechanisms, convey motion to a shaft, I, having its bearings in front of the boiler in the frame C, on a level with the rear axle. This shaft has at each end a sprocket-wheel, $l$, connected with similar though larger sprocket-wheels $l^1$ upon the rear axle by means of endless chains J. These cylinders are provided with the usual valves, steam-pipes, valve-gears, and reversing-gears, the latter being actuated by a ratcheted pull-bar, K, connected therewith, and extending in rear to the cab, within easy reach of the engine-driver. Below shaft I, and having its bearings in arms projecting from the boiler, is a shaft, I', carrying a drum, L', and provided at one end with a gear, $k$, that meshes with a worm, $l^2$, upon an inclined shaft, S, arranged in suitable bearings at the side of the boiler, and terminating in rear at the cab. Rotary motion is imparted to the shaft S, and consequently to the drum-shaft, by means of a band-wheel or crank-arm, $m$.

V V' represent wire ropes or chains, secured each at one end to the front axle near the transporting-wheels N, and, being crossed, are then secured to opposite ends of the drum, the one passing under and the other over the same, so that when the drum is rotated by the mechanism above described, or by similar means, one of these ropes will be wound up and the other paid out, causing the front axle to turn on its center and the road-engine to be directed right or left, as the case may be.

In practice the driving-wheels have sufficiently broad treads to support the weight of the boiler and engines.

In order to prevent the bearing of the support upon the reach from binding when the road-engine is in motion, I use a subsidiary reach, R, pivoted to vibrate vertically to the bottom of the boiler to allow the spring free movement, and to the front axle to allow it to turn freely.

P indicates a shaft arranged in suitable bearings upon the reach, and carrying at one end a pulley, $p$, and at the other a sprocket-wheel, $q$. By unshipping the endless chains J and connecting one of the sprocket-wheels $l$ with the wheel $q$ aforesaid, this mechanism is utilized in driving thrashing-machines and other agricultural machinery.

What I claim as new, and desire to secure by Letters Patent, is—

1. The combination, with the boiler A, of the rear frame C, bolted thereto and supported by the diverging braces $c.c'$, the cab B, supported by said frame, and the reach E, bolted at one end to the boiler-front, and supported by the fore axle at the other, substantially as specified.

2. The combination, with a boiler having an engine upon its front, of a horizontal frame, C, bolted thereto, extending in rear, and supporting a cab, B, and a reach, E, secured to the front of the boiler above said frame and supported by the fore axle, as set forth.

3. The combination, with the boiler A, rear frame C, pedestals C', axle A', and driving-wheels B', of the reach E, having front bearing $h$, the support F, journaled therein, and having spaced legs $j$ straddling the fore axle, and a spring, G, between said axle and the support, substantially as specified.

4. The combination, with the tubular-ended axle A', of rods $f$ in said axle and movable endwise, the cross-head, and key-pawl $e'$ at each end of said rod, the driving-wheels B', having interior chamber $e$, with opposite ratcheted walls $i\ i'$, rings $g'$, embracing the axle and secured to the cross-heads, the forked levers D, engaging said rings, and a spring, D', connecting the ends of said levers, substantially as specified.

In testimony that I claim the above I have hereunto subscribed my name in the presence of two witnesses.

W. L. HUSSEY.

Witnesses:
WILLIAM TRIPLETT,
I. W. MATTHEWS.